Figure 2:
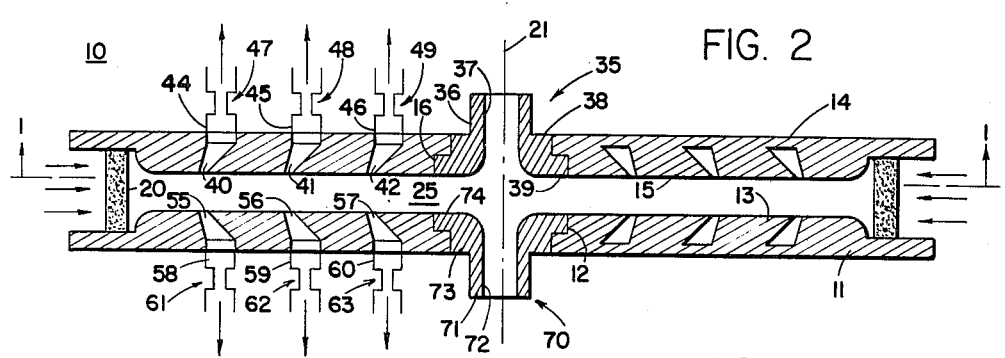

March 29, 1966  R. J. REILLY  3,242,728
VORTEX RATE SENSOR
Filed Dec. 28, 1961

INVENTOR.
RICHARD J. REILLY
BY Roger W. Jensen
ATTORNEY.

United States Patent Office 3,242,728
Patented Mar. 29, 1966

3,242,728
VORTEX RATE SENSOR
Richard J. Reilly, St. Paul, Minn., assignor to
Honeywell Inc., a corporation of Delaware
Filed Dec. 28, 1961, Ser. No. 162,819
9 Claims. (Cl. 73—194)

This invention pertains to fluid amplifiers and more particularly to improved vortex fluid amplifiers.

This invention has special application to angular velocity or rate sensing instruments commonly referred to by those skilled in the art as a vortex rate sensor, although the invention is by no means limited to such an application. The applicant's invention will be described as applied to a vortex rate sensor which is a specific embodiment of a vortex fluid amplifier. A vortex rate sensor is an apparatus which is capable of sensing the angular velocity (rate) about an axis of a body upon which the vortex rate sensor is mounted. The measurement of angular velocity (rate) is, as is well understood, useful and/or necessary in many control systems. For example, an angular rate signal is very useful for control purposes in automatic flight and/or attitude control systems of aircraft and space craft. A vortex rate sensor generally comprises a device which provides a fluid flow field which is analogous to a classical two-dimensional pure sink flow in the absence of an input rate. The fluid in such a pure sink flow has only radial velocity. When the vortex rate sensor is subjected to an angular velocity about the input axis, a tangential or rotational velocity is imparted to the fluid. The tangential or rotational flow only is described as a pure vortex flow. The pure vortex flow is super-imposed upon the pure sink flow and results in a combined vortex-sink flow in which the fluid streamline pattern is a logarithmic spiral.

It should be noted that the radial velocity of a fluid in a pure sink flow will increase as the fluid approaches the sink (also referred to as bore, passage, or exit tube) because of the narrowing of the streamlines of the fluid. Also, the tangential or rotational velocity of a fluid in a potential vortex flow will increase as the fluid approaches the sink (the product of velocity X radius is constant) because of the principle of conservation of angular momentum. It follows that the velocity of a fluid in a vortex-sink flow increases as the fluid approaches the sink. Thus the vortex fluid amplifier possesses a characteristic of amplification of the parameter to be sensed within the sensing element itself. Various amplification levels may be obtained by varying the geometry of the vortex fluid amplifier.

As pointed out above, an angular velocity input about the input axis of the vortex fluid amplifier results in the superpositioning of a pure vortex flow upon an approximate pure sink flow by imparting a rotational or tangential velocity to the fluid of the vortex fluid amplifier. Consequently, by sensing the effect of an angular velocity input upon the fluid flow of the vortex fluid amplifier by suitable means, one may obtain an output signal indicative of angular velocity input. This signal, of course, may be utilized to control any apparatus with requires such information.

The applicant has provided an improved vortex fluid amplifier capable of providing heretofore unobtainable sensitivity by the substantial elimination of aerodynamic or hydrodynamic noise. In addition, the applicant provides an increased signal level and obtains a more rapid time response. The applicant accomplishes these results by providing means for delaying the transition of the fluid flow within the vortex fluid amplifier from laminar flow to turbulent flow while at the same time allowing a higher flow velocity through the vortex fluid amplifier. The transition from the laminar flow to turbulent flow within the vortex fluid amplifier is delayed by removal of the energy degraded boundary layer of the fluid thereby allowing "new" high energy fluid from the main flow, to replace the boundary layer thus removed. The energy degraded boundary layer is removed through annular slots in the bounding plates of the vortex fluid amplifier.

It is an object of this invention to provide an improved vortex type fluid amplifier.

Figure 1:
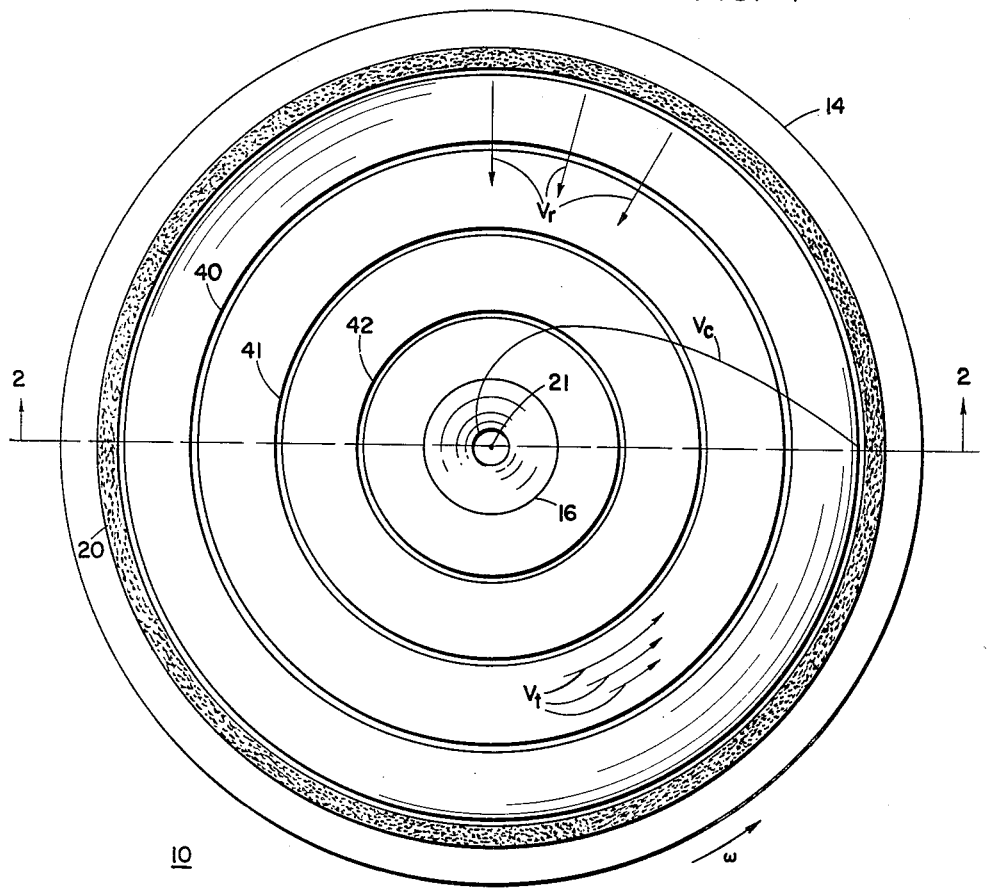

This and other objects of the invention will become apparent from a study of the accompanying specification and figures in conjunction with the drawings in which:

FIGURE 1 is a schematic cross-sectional view of a vortex rate sensor taken along lines 1—1 of FIGURE 2; and FIGURE 2 is a schematic cross-sectional view of a vortex rate sensor taken along lines 2—2 of FIGURE 1.

Referring now to FIGURE 1, the applicant's invention will be described as applied to one form of a vortex fluid amplifier referred to by those skilled in the art as a vortex rate sensor. Reference numeral 10 generally depicts a vortex rate sensor. A generally cylindrical plate element 14 is provided having a central aperture 16 of circular cross section therein. Referring to FIGURE 2, plate element 14 has a plane surface 15 thereon. A second generally cylindrical plate element 11 is provided having plane surface 13 thereon. Plate element 11 has a central aperture 12 of circular cross section therethrough.

Reference numeral 20 depicts a ring-shaped, annular, or cylindrical porous coupling means. The term porous as utilized in this specification means permeable to fluids. Coupling means 20 in one form is constructed on sintered metal and is porous in nature so as to allow fluid to pass therethrough. The applicant does not wish to be limited to the particular coupling means illustrated; other suitable porous coupling means may be utilized for example screens, ceramics, and the like. The applicant's invention is applicable to all types of vortex fluid amplifiers, regardless of the means utilized to induce vorticity in the fluid flow (e.g. tangential jets).

Cylindrical coupling means 20 is positioned between plane surface of plate element 11 and plane surface 15 of plate element 14 thereby maintaining plane surfaces 13 and 15 in a spaced, parallel relationship. The axis of the cylindrical coupling means 20 is identified by reference numeral 21.

Plate elements 11 and 14 in conjunction with coupling means 20 collectively define a vortex chamber 25. The outer periphery of chamber 25 is defined by coupling means 20. The ends of cylindrical chamber 25 are defined by the plane surface 13 of plate element 11 and the plane surface 15 of plate element 14.

A first exit member 35 is provided. Exit member 35 comprises a tube 36 having a generally cylindrical bore or passage 37 therethrough. The applicant does not wish to be limited to the cylindrical passage illustrated, other configurations are within the scope of this invention. Tube 36 has an external flange portion 38 on one end thereof. The flange portion 38 is positioned within aperture 16 of plate element 14 such that passage 37 of exit member 35 is positioned substantially coaxial with axis 21. However, other configurations of a vortex rate sensor in which the exit passage is deliberately offset from axis 21 (not coaxial) to take advantage of the flow characteristics may be utilized. An end surface 39 of exit member 35 is positioned so as to lie in the same plane as the plane surface 15 of plate element 14. Exit member 35 is rigidly attached to plate element 14 by suitable means (not shown) such as adhesives or screws.

Plate element 14 is provided with a plurality of concentric slots 40, 41 and 42 therein. In the embodiment illustrated the slots are shown schematically. Boundary layer removal slots are carefully contoured to provide minimum flow disturbance in working models. Those skilled in the art will recognize the need for the initial inclination of the slot to be as nearly tangent to surface 15 as possible. Slots 40, 41 and 42 are in communication with chamber 25. In the embodiment illustrated, slots 40, 41 and 42 extend 360° about axis 21. It should be noted that in other embodiments it is possible to utilize slots which do not extend 360° above axis 21. Thus plate element 14 is a rigid structure, comprising a generally cylindrical plate having a plurality of slots bored a short distance into the plate from surface 15.

In the embodiment illustrated, the slots are each in communication at one point with suitable conduit means. This is accomplished by drilling a small hole at one point through plate element 14 so that the hole is in communication with each slot. Thus slots 40, 41 and 42 are respectively in communication with or connected to suitable conduit means 44, 45 and 46. It should be pointed out that other embodiments may utilize a plurality of conduits in communication with each slot, for example, four conduits positioned 90° about axis 21.

Conduit means 44, 45 and 46 have variable restriction means 47, 48 and 49 therein respectively. The function of restriction means 47, 48 and 49 will be more fully discussed hereinafter. It should be pointed out that the restriction means 47, 48 and 49 may be positioned within plate 14 so as to eliminate the need for the conduit means 44, 45 and 46. Also slots 40, 41 and 42 may be characterized so as to provide the necessary restriction by means of the slot geometry and therefore eliminate the requirement of the conduit means 44, 45 and 46 and restriction means 47, 48 and 49.

It should be pointed out that it may be desirable to utilize only a single annular slot or a single slot extending less than 360° about axis 21 within plate element 14 depending on the relative size of the vortex rate sensor 10.

Plate element 11 is also provided with a plurality of annular concentric slots 55, 56 and 57 therein. Slots 55, 56 and 57 are concentric with axis 21 of coupling means 20. Slots 55, 56 and 57 are identical with slots 40, 41 and 42 respectively.

Slots 55, 56 and 57 are each in communication with a suitable conduit means 58, 59 and 60 respectively. Conduit means 58, 59 and 60 have variable restriction means therein respectively. As discussed above with reference to slots 40, 41 and 42, restriction means 61, 62 and 63 may be positioned within plate element 14 thus eliminating the requirement of conduit means 58, 59 and 60. Also slots 55, 56 and 57 may be constructed so as to provide the necessary restriction by means of the slot geometry, in which event restriction means 61, 62 and 63 and conduit means 58, 59 and 60 would not be required. The applicant does not wish to be limited to the embodiment illustrated for plate 11, other slot configurations as discussed above with reference to slots 40, 41 and 42 are within the scope of the invention.

A second exit member 70 is also provided. Exit member 70 comprises a tube 71 having a generally cylindrical bore or passage therethrough. The applicant does not wish to be limited to the cylindrical passage illustrated, other configurations are within the scope of the invention. Thus 71 has a flange portion 73 on one end thereof. The flange portion 73 is positioned within the aperture of plate element 11 such that the passage 72 of exit member 70 is positioned substantially coaxial with axis 21. However, other configurations of a vortex rate sensor in which the exit passage is deliberately offset from the axis 21 (not coaxial) to take advantage of the flow characteristics may be utilized. An end surface 74 of exit member 70 is positioned so as to lie in the same plane as the plane surface 13 of plate member 11. Exit member 70 is rigidly attached to plate member 11 by suitable means (not shown) such as adhesives or screws.

It should be noted that the vortex rate sensor may be constructed as only a single exit member. For example exit member 35 could be eliminated and all of the fluid exhausted out of passage 72 of exit member 70.

A suitable pickoff (not shown) is utilized in the vortex rate sensor 10 to determine the flow pattern and thus the input rate or angular velocity imparted to the vortex rate sensor. A suitable type of pickoff means is disclosed in the copending application Serial No. 156,613, filed Dec. 4, 1961, in the name of the present inventor, and assigned to the same assignee as the present application. The copending application discloses a fluid flow sensor or pickoff means positioned within an exit passage of the vortex rate sensor 10. The fluid flow sensor comprises a blade element positioned within the exit passage and pressure port positioned on each side of the blade element. The pressure differential across the blade element is indicative of the fluid flow pattern in the input rate.

*Operation*

In operation, a pressure differential exists between coupling means 20 and passages 37 and 72 of exit members 35 and 70 respectively. Consequently a fluid flows through coupling means 20, through chamber 25 and exhausts through passages 37 and 72. In the absence of any input (angular velocity about axis 21), the fluid flow has only radial velocity as illustrated by vectors $V_r$ in FIGURE 1; this radial flow is described by those skilled in the art as approximately a pure sink flow. The radial velocity of the fluid increases as the fluid approaches the sink (passages 37 and 72).

When the vortex rate sensor 10 is subjected to an input rate, that is, an angular velocity $\omega$ about the axis 21, the fluid which is flowing through coupling means 20 is given a tangential or rotational velocity as illustrated by the vector $V_t$, in FIGURE 1. A flow field of tangential or rotational velocity only is referred to by those skilled in the art as a pure vortex flow. The tangential or rotational velocity of the fluid increases ($V_t X_r = $ Constant) as the fluid approaches the sink (passages 37 and 72), in accordance with the application of the principle of conservation of angular momentum.

The superposition of a pure vortex flow upon a pure sink flow results in a combined vortex-sink flow. The streamline pattern of the fluid in the combined vortex sink flow is a logarithmic spiral as identified by reference symbol $V_c$. As the fluid flowing in the logarithmic spirial flow pattern reaches the sink, it flows out of chamber 25 into passages 37 and 72. This results in a fluid flow pattern in the form of a helix in passages 37 and 72. That is, there is a component of fluid flow having a longitudinal velocity parallel to the axis 21 and a component of fluid flow having a rotational velocity perpendicular to axis 21. It should be noted that a component of the fluid flow within passages 37 and 72 perpendicular to the axis 21 is indicative of input rate $\omega$. Consequently, it is possible to sense the input rate $\omega$ by determining the magnitude of the tangential component of the fluid flow.

The magnitude of the tangential component of the fluid flow is determined with a pressure and flow responsive fluid flow sensor such as disclosed in the applicant's copending application. However, the sensitivity of the vortex sensor is limited due to the development of aerodynamic or hydrodynamic noise within the vortex rate sensor. The sensitivity is also a function of the velocity of the fluid through the vortex rate sensor. The aerodynamic or hydrodynamic noise is attributable to the transition of the fluid flow through chamber 25 from laminar flow to turbulent flow.

As is well understood by those skilled in the art, the phenomena of transition from laminar flow to turbulent flow is determined by the interaction of the inertia forces of the fluid and the viscous forces of the fluid. When the viscous forces predominate the flow is laminar, when the inertial forces predominate the flow is turbulent. More specifically the interaction of the viscous and inertial forces is defined by the formula $N_r = _pVD/\mu$ in which $N_r$ is defined as Reynolds number; $_p$=fluid density; $V$=average fluid velocity; $\mu$=dynamic viscosity; and $D$=characteristic length.

As the fluid flows through chamber 25 there is a thin layer of fluid which adhers to the surfaces 13 and 15 and thus has a zero velocity with respect to those surfaces. Some distance away from the surface, in the region normal to the surfaces, the fluid has a constant velocity V. The region normal to the surfaces, in which the velocity of the fluid varies from zero to V is identified as the boundary layer. The work done by the viscous stresses opposing the relative motion in the boundary layer results in the dissipation of energy in the form of heat. Continued reduction of energy as the flow progresses through chamber 25 is accompanied by an increase in the thickness of the boundary layer.

As the fluid velocity is increased, transition occurs producing turbulent flow within chamber 25. The turbulence results in microscopic perturbations in the pressure field associated with that flow which results in low-level aerodynamic or hydrodynamic noise in a pressure sensitive pickoff means, thus limiting the sensitivity of the vortex rate sensor.

The applicant increases the sensitivity of the vortex rate sensor and substantially eliminates the aero-dynamic or hydrodynamic noise by maintaining the fluid flow laminar between surfaces 13 and 15 at a relatively high velocity. In addition, the applicant obtains a more rapid time response and an increased signal level as compared to prior art fluid amplifiers of this type. This is accomplished by the utilization of slots 40, 41 and 42 and slots 55, 56 and 57 which are in communication with a low pressure source relative to chamber 25. Consequently a portion of the fluid is removed from chamber 25 through slots 40, 41 and 42 and 55, 56 and 57. This results in removal of the energy degraded boundary layer adjacent plates 13 and 15 and allows high energy fluid from the main flow to replace the boundary layer removed. Consequently transition is prevented, and the fluid flow is maintained laminar in chamber 25. This allows a vortex sensor 10 to be operated with a fluid velocity higher than prior art devices without transition to turbulent flow. Consequently the vortex rate sensor has an increased signal level and a more rapid time response. In addition the aerodynamic or hydrodynamic noise attributable to the turbulent flow between surfaces 13 and 15 is substantially eliminated.

Since the fluid flowing from coupling means 20 to the passages 37 and 72 experiences a pressure drop across chamber 25, the pressure of the fluid decreases at the positions of slots 40, 41 and 42 respectively. The pressure of the fluid in chamber 25 decreases at the positions of slots 55, 56 and 57 respectively. For this reason restrictions 47, 48 and 49 and 61, 62 and 63 must be proportional to insure that the slots 40, 41 and 42 and 55, 56 and 57 remove the correct amount of fluid at their respective locations, from the chamber 25. Thus if conduits 44, 45 and 46 and 58, 59 and 60 are all connected to the same low pressure source, restriction means 47 and 61 must provide a greater restriction than restriction means 48 and 62, which in turn must provide a greater restriction than restriction means 49 and 63. This is because the pressure at slots 40 and 55 is greater than the pressure at slots 41 and 56, and the pressure at slots 41 and 56 is greater than the pressure at slots 42 and 57. It should be pointed out that the restriction means may be positioned within the slot means so as to eliminate the requirement of the conduit means. In addition, the various slots may be proportioned so as to provide the necessary restriction to the fluid flow without the requirement of additional restriction means, in which case, it would be possible to eliminate both the conduit means and the restriction means.

Thus it is clear that the applicant has provided an improved vortex fluid amplifier. The improved fluid amplifier possesses a greater sensitivity than prior art vortex fluid amplifiers and in addition provides an increased signal level and a more rapid time response. The applicant obtains his improved fluid amplifier by providing concentric slots for removing the boundary layer of the fluid flowing in the chamber of the fluid amplifier and thus maintaining laminar flow therein at a relatively high fluid velocity.

While I have shown and described the specific embodiment of this invention, further modification and improvements will occur to those skilled in the art. I desire it to be understood therefore that this invention is not limited to the particular form shown and I intend in the appended claims to cover all modifications which do not depart from the spirit of the scope of this invention.

What I claim is:

1. In a vortex fluid rate sensor: a first element having a plane surface thereon; a second element having a plane surface thereon; cylindrical porous coupling means positioned between said plane surface of said first element and said plane surface of said second element thereby forming a chamber; said first element having a plurality of slots therein concentric with the axis of said coupling means, said second element having a plurality of slots therein concentric with the axis of said coupling means, the slots being in communication with said chamber; a plurality of conduits, one of said conduits being in communication with each of said slots; restriction means positioned within said conduits, said first element having an opening therethrough, and an exit member positioned within said opening in said first element substantially coaxial with said axis of said coupling means.

2. In a vortex fluid rate sensor: a first element having a plane surface thereon; a second element having a plane surface thereon; cylindrical porous coupling means positioned between said plane surface of said first element and said plane surface of said second element thereby forming a chamber; said first element having an annular slot therein substantially concentric with the axis of said coupling means; and second element having an annular slot therein substantially concentric with said axis of said coupling means, the slots being in communication with said chamber; conduit means, one of said conduit means being in communication with each of the slots; restriction means positioned within said conduit means, said first element having an opening therethrough, and an exit member positioned with said opening substantially coaxial with said axis of said coupling means.

3. In a fluid rate sensor: a first element having a plane surface thereon and a plurality of concentric slots therein; a second element having a plane surface thereon and a plurality of concentric slots therein; cylindrical porous coupling means positioned between said plane surface of said first element and said plane surface of said second element concentric with the slots thereby forming a chamber, the slots being in communication with said chamber; a plurality of conduits, one of said conduits being in communication with each of said slots; and restriction means positioned within said conduits; said first element having a passage therethrough located substantially parallel with the axis of said coupling means.

4. In a fluid rate sensor: a first element having a plane surface thereon and an annular slot therein; a second element having a plane surface thereon and an annular slot therein; cylindrical porous coupling means positioned between said plane surface of said first element and said plane surface of said second element concentric with the slots thereby forming a chamber, the slots being in communication with said chamber; conduit means, one of said conduit means being in communication with each of the slots; and restriction means positioned within said conduit means; said first element having a passage therethrough located substantially parallel with the axis of said coupling means.

5. In a fluid rate sensor: a first element having a surface thereon; a second element having a plane surface thereon; cylindrical porous coupling means positioned between said surface of said first element and said surface of said second element thereby forming a chamber; said first element having a plurality of slots therein concentric with the axis of said coupling means, said second element having a plurality of slots therein concentric with said axis of said coupling means, the slots being in communication with said chamber, said first element having an exit passage therethrough substantially parallel with the axis of said coupling means.

6. In a fluid rate sensor: a first element having a surface thereon and an annular slot therein; a second element having a surface thereon and an annular slot therein; and porous coupling means positioned between said surface of said first element and said surface of said second element concentric with the slots thereby forming a chamber; the slots being in communication with said chamber, said first element having an exit passage therethrough located substantially parallel with the axis of said coupling means.

7. In a fluid rate sensor: a first element having a surface thereon; a second element having a surface thereon; porous coupling means positioned between said surface of said first element and said surface of said second element thereby forming a chamber; said first element having an exit passage therethrough, means for providing fluid flow through said coupling means, said chamber and said exit passage; and means for removing a portion of the fluid flowing through said chamber as as to substantially reduce the viscous losses in the flow of the fluid through the chamber.

8. In a fluid amplifier: means forming a chamber symmetrical about an axis, said chamber having at least one interior surface; exit passage means in fluid communication with said chamber; means for providing a radial flow of fluid through said chamber and out said exit passage means; means for introducing a vortical component to said fluid flow; and means for removing a portion of the fluid flow through said chamber so as to substantially reduce the viscous losses in the flow of said fluid through said chamber.

9. In a fluid amplifier: means forming a chamber symmetrical about an axis including at least one interior surface; exit passage means in fluid communication with said fluid chamber; means for providing a radial flow of the fluid through said chamber and out of said exit passage means; means for introducing a vortical component to said fluid flow; and means for removing the energy degraded portion of said fluid from said chamber so as to substantially reduce the viscous losses in the fluid flow therethrough.

References Cited by the Examiner

Pengelly: Journal of Applied Physics, January 1957, pages 86–92. Volume 28 of No. 1, Copy in Scientific Library 73–204.

RICHARD C. QUEISSER, *Primary Examiner.*

ROBERT EVANS, SAMUEL FEINBERG, *Examiners.*

S. C. SWISHER, L. L. HALLACHER,
*Assistant Examiners.*